United States Patent [19]

Waterston

[11] 3,898,843
[45] Aug. 12, 1975

[54] ON-OFF FLOW CONTROL DEVICE AND IRRIGATION SYSTEM INCORPORATING SAME

[75] Inventor: William Waterston, Dunedin, New Zealand

[73] Assignee: G. Methven & Co., Limited, South Dunedin, New Zealand

[22] Filed: May 22, 1973

[21] Appl. No.: 362,764

[52] U.S. Cl. .............................. 61/13; 47/1; 137/78; 251/145
[51] Int. Cl. ...................... E02b 13/00; F16k 51/00
[58] Field of Search .............. 137/67, 78; 61/12, 13; 239/63; 73/337; 251/145

[56] References Cited
UNITED STATES PATENTS

| | | | |
|---|---|---|---|
| 3,204,872 | 9/1965 | Whear | 137/78 X |
| 3,434,348 | 3/1969 | Smith et al. | 73/337 |

Primary Examiner—Martin P. Schwadron
Assistant Examiner—Richard Gerard
Attorney, Agent, or Firm—Holman & Stern

[57] ABSTRACT

The invention relates to a variable opening and closing flow control device for a fluid supply line, the device being operable according to the moisture content of the medium surrounding the device, such as soil in which the line and device is buried.

The device includes a moisture sensitive element composed of a moisture absorbing material having the capacity of swelling as it absorbs moisture and contracting as it dries, this element being mounted adjacent an aperture in the line and a fluid barrier is provided between the aperture and element, and a flow passage is provided through said aperture, the swelling pressure and contraction of the moisture sensitive element being arranged to gradually close off and open respectively the flow passage dependent upon the moisture content of the medium surrounding the device.

An irrigation system incorporating such flow control device is also provided.

12 Claims, 5 Drawing Figures

ON-OFF FLOW CONTROL DEVICE AND IRRIGATION SYSTEM INCORPORATING SAME

The present invention relates to a variable opening and closing flow control device for a fluid supply suitable for incorporation in a subterranean irrigation system for example and in particular a device arranged to be operable according to the moisture content of the medium surrounding the device, such as soil in which the device is buried, to control a supply of water or other liquid.

Accordingly it is one object of the present invention to provide means enabling the variable opening and closing flow control for fluid supply according to the moisture content of the medium surrounding said means.

According to one aspect of the present invention a variable opening and closing flow control device for a fluid supply includes a moisture sensitive element composed of a moisture absorbing material having the property of swelling as it absorbs moisture and contracting as it dries, whereby the swelling and contraction of said moisture sensitive element is arranged to control said fluid supply in dependence upon the moisture content of the medium surrounding the device.

According to a further aspect of the present invention a variable opening and closing flow control device for an underground fluid supply line includes a moisture sensitive element mounted in proximity to an aperture in the fluid supply line and composed of a moisture absorbent material having the property of swelling as it absorbs moisture and contracting as it dries; a flexible fluid barrier member positioned between said aperture and said element and means inserted through said aperture into the fluid supply line providing a flow passage through said aperture from said supply line and discharging between said barrier member and said supply line, whereby the swelling and contraction of said moisture sensitive element is arranged to apply pressure onto the fluid barrier member which controls the flow of fluid through said flow passage from the supply line.

In one form of the invention envisaged the fluid supply line, which is buried in soil, is encased at its point of discharge beneath the soil by a fluid barrier member in the form of a flexible sleeve member, which is open at its ends and/or perforated. A discharge aperture is provided in the supply line thus encased by the sleeve member, and a rivet-like or screw-like member is passed through the sleeve member and into said aperture and it has a bore, slot or the like in the end portion of its length protruding into the supply line, and said bore, slot or the like communicates between the tip of the member and the space between the supply line and the sleeve member, thus enabling the fluid from the supply line to flow into this space to escape from the ends of the sleeve member or through perforations therein. A moisture sensitive element of moisture absorbing material encircles the other end portion of the screw-like or rivet-like member and is held between the outer surface of the sleeve member, and a head of the screw-like or rivet-like member or a member connected thereto, said element being of a material which swells on absorbing moisture from the surrounding soil and presses the wall of the sleeve member against the supply line around the discharge aperture therein and closes off the escape for the fluid through the bore, slot or the like in the rivet-like or screw-like member.

It is envisaged that the moisture sensitive element for example be composed of a moisture-absorbent plastics material or of vegetable fibre which swells upon absorbing moisture and contracts as the moisture evaporates therefrom.

In an alternative form of the invention envisaged the fluid barrier member is in the form of a sheet member rather than a sleeve member or casing lying between the moisture sensitive element and the fluid supply line, whereby the fluid escaping from the supply line is not in direct communication with the moisture sensitive element.

According to yet another aspect of the present invention an irrigation system comprises a liquid supply conduit having at least one variable opening and closing flow control device interposed therein and located beneath the surface of the soil in the area to be irrigated, such conduit being arranged to supply and discharge liquid beneath the surface of the soil to be irrigated, said control device including a moisture sensitive element composed of a moisture absorbing material having the property of swelling when it absorbs moisture and contracting when it dries, whereby swelling and contraction of said moisture sensitive element is arranged to close off and open said liquid supply in dependence upon the moisture content of the soil surrounding the device.

According to yet another aspect of the present invention an irrigation system comprises a liquid supply line having at least one variable opening and closing flow control device located beneath the surface of the soil adjacent to the area to be irrigated, said supply line being arranged to supply and discharge liquid beneath the surface of the soil to be irrigated and said flow control device including a moisture sensitive element mounted in proximity to an aperture in the fluid supply line and composed of a moisture absorbent material having the property of swelling as it absorbs moisture and contracting as it dries; a flexible fluid barrier member positioned between said aperture and said element and means inserted through said aperture into the fluid supply line providing a flow passage through said aperture from said supply line and discharging between said barrier member and said supply line, whereby the swelling and contraction of said moisture sensitive element is arranged to apply pressure onto the fluid barrier member which controls the flow of fluid through said flow passage from the supply line.

In order that the invention may be more readily understood several embodiments thereof are described below by way of example only and with reference to the accompanying drawings, in which.

Figure 1:
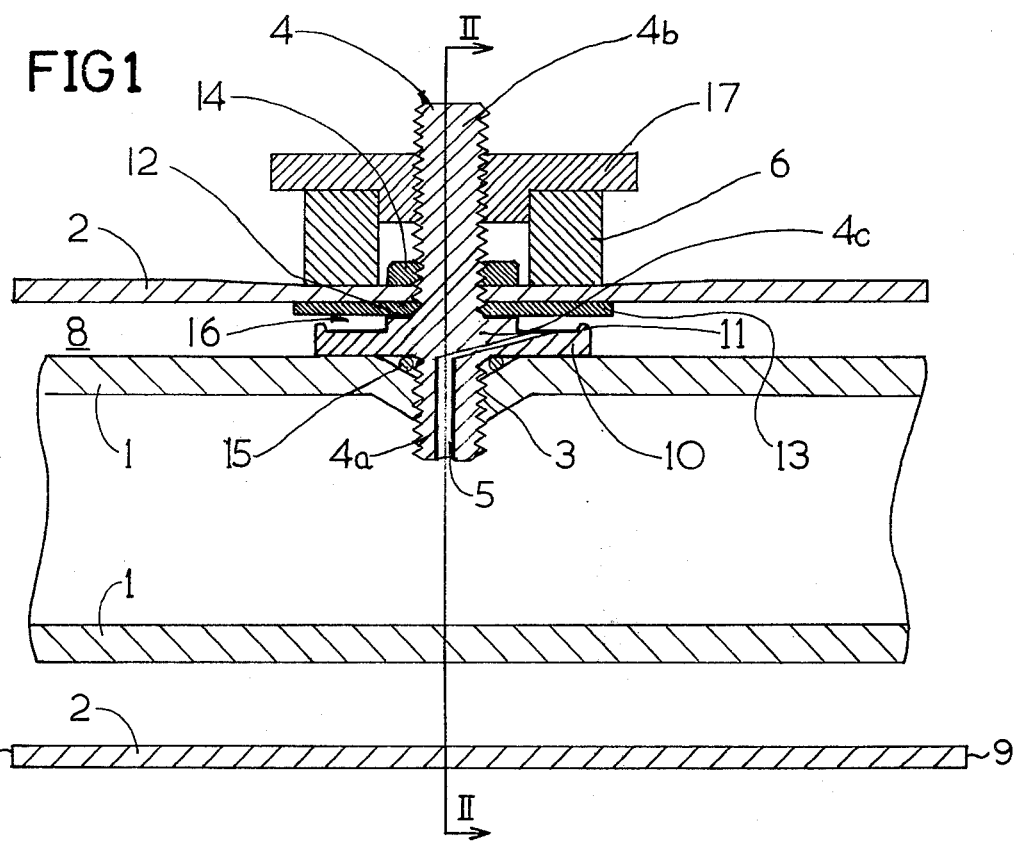
FIG. 1 is a longitudinal section through a fluid supply line incorporating a preferred form of the flow control device of the present invention.
Figure 2:
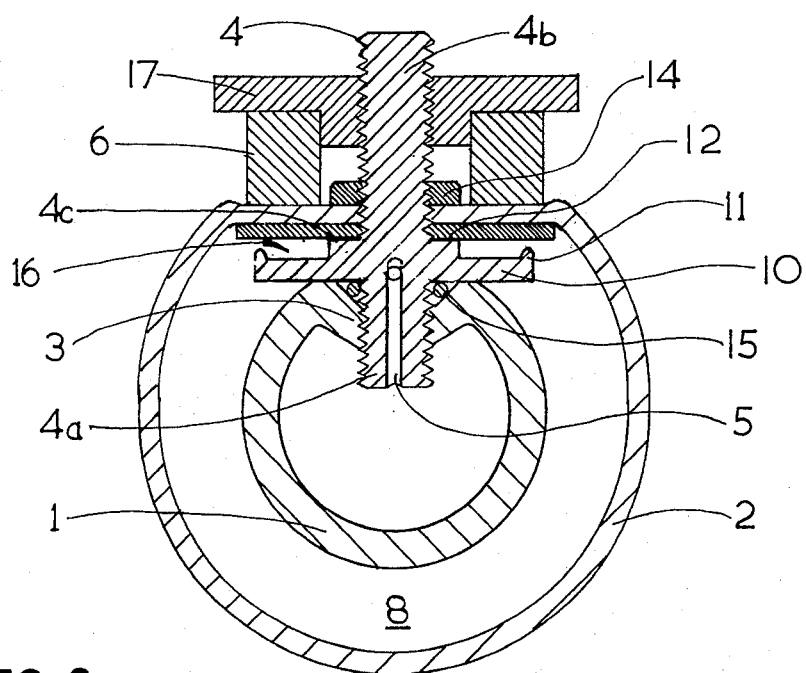
FIG. 2 is a cross-section along the line II-II of FIG. 1.
Figure 3:
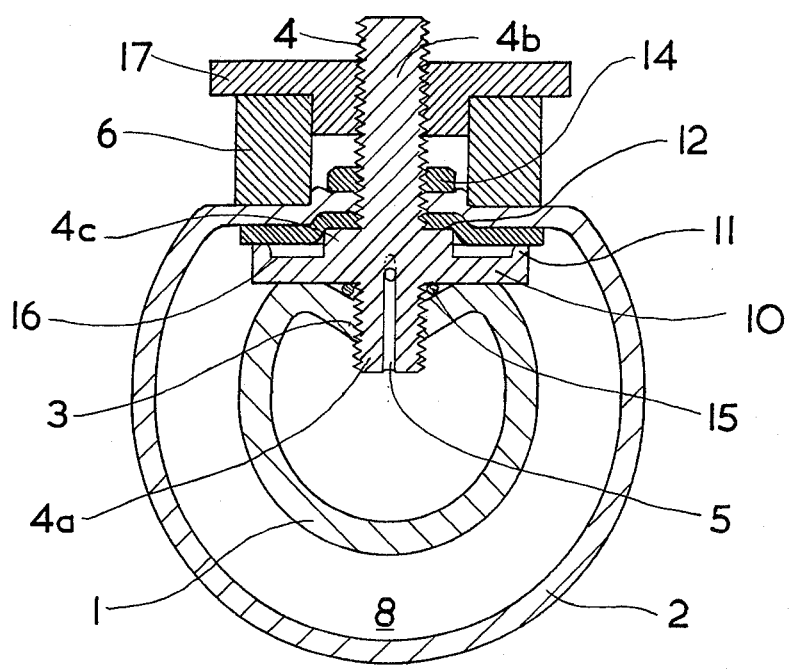
FIG. 3 is a similar cross-section as that in FIG. 2, but with the flow control device closed off.

As shown in FIGS. 1, 2 and 3 a preferred form of variable opening and closing flow control device for a fluid supply system according to the present invention is provided, in which a short flexible sleeve member or casing 2 surrounds a fluid line 1 at its point of discharge and is spaced therefrom. A screw-like member 4 which is preferably self tapping is passed through the casing 2 and through a discharge outlet aperture 3 provided in the fluid line 1. The screw-like member 4 is formed with a predominantly elongate body for example like a bolt and one end portion 4a is screw-threaded into the discharge outlet aperture 3 and the fluid line 1. The other end portion 4b is likewise screw-threaded and arranged to extend beyond the outer surface of the casing 2. The intermediate portion 4c is provided with a flange 10 extending radially therefrom and which is provided with peripheral shoulder 11 extending from one surface thereof projecting toward the inner surface of the casing or sleeve member 2. The diameter of the intermediate body portion 4c is enlarged relative to the end portions 4a, 4b and form an annular shoulder 12 against which the inner margin of an annular washer member 13 may engage, the washer member 13 being preferably resilient and lying against the inner surface of the sleeve member or casing 2. A nut 14 is engaged on the threaded end portion 4b whereby the sleeve member or casing 2 is gripped between the nut and the washer 13 and about the portion 4b of the member 4 to make a seal here. The washer 13 may be made of a resilient material such as rubber.

In this way the member 4 is positioned into the discharge outlet aperture 3 in the fluid line 1 with the flange 10 extending radially therefrom into the space 8 between the fluid line and sleeve 2 and preferably with the provision of a seal member 15, such as an O-ring seal between the outer surface of the fluid line 1 and the flat surface of the flange 10 engaging the outer surface of the fluid line 1. A bore 5 is provided in the end portion 4a of the member 4 and continuing at an angle through the flange 10 and into an annular recess 16 formed in the body portion 4c of body member 4 inwardly of the peripheral shoulder 11 of the flange 10. In this way communication is provided between the interior of the fluid line 1 and the space 8.

A moisture sensitive element 6 of moisture absorbing material in the form of an annulus or sleeve for example is engaged around the other portion 4b of the member 4 with its one annular surface engaged with the outer surface of the sleeve member or casing 2 and with a nut 17 adjustably screw-threaded onto the portion 4b of the member 4 to hold the member 6 in contact with the sleeve member 2, and thus enable adjustment of the cut-off position for the device.

The moisture sensitive element 6 is composed of a moisture absorbing material which swells with an increase in its moisture content and conversely contracts with a decrease in its moisture content. The element may be composed of a moisture absorbent plastics material or vegetable fibres or the like. The flow of fluid from the fluid supply line 1 into the annular space 8 may pass to the ends 9 of the sleeve member or casing 2 which acts as a fluid carrier between the element 6 and aperture 3, such that moisture flowing to the soil surrounding the aperture in which the fluid line is buried, must seep past the ends of the sleeve member 2 before reaching element 6. Dependent upon the porosity of the ground in which the supply line and its flow control device are buried, and the rate of flow of the fluid from fluid line 1 the fluid will eventually come into contact with the soil immediately surrounding the moisture sensitive element 6.

Thus as the moisture content of the ground directly surrounding the moisture sensitive element increases the moisture absorbing element 6 itself will absorb moisture and expand thus pressing onto the outer surface of the flexible sleeve member or casing 2. With continued swelling of the moisture sensitive element 6 the pressure applied to the flexible sleeve member will increase to force the flexible sleeve member 2 and the washer 13 into contact with the peripheral shoulder member 11 of flange 10 to gradually close off the annular space 16 (see FIG. 3) to control the fluid flow from the fluid line 1 to a slow trickle and finally completely cut off this flow from the annular space 8. Only when the moisture in the moisture sensitive element and hence in the ground surrounding the element has been withdrawn by the plants being irrigated or dried out by sun and wind will the moisture sensitive element 6 gradually contract and thus slowly release the pressure on the washer 13 and gradually re-open communication between the annular recess 16 and the annular space 8 and hence gradually recommence and increase the fluid flow to the outer ends 9 of the sleeve member 2 and hence to the surrounding soil.

The sleeve member or casing 2 and washer 13 are preferably made from a resilient material to absorb any overtravel of the moisture sensitive element 6. The inner fluid supply line 1 can be made of a semi-rigid or rigid plastics material such as P.V.C. or polyethylene. The amount of moisture allowed to flow from the fluid supply line 1 to the surrounding soil can be governed by a slight adjustment of the nut 17 and by the length chosen for the flexible casing sleeve member 2 or the line 1 between the moisture sensitive element 6 and the end 9 of the casing. Furthermore the porosity of the ground in which the fluid supply line is buried will also control the amount of moisture allowed to flow.

It is envisaged that the flexible sleeve member or casing 2 could be provided with apertures which will also increase the egress of fluid from the annular space 8 to the surrounding soil if desired.

It is furthermore envisaged that the fluid barrier member be provided in the form of a flexible sheet member in place of the flexible sleeve member or casing 2. The sheet member acts as a fluid barrier between the moisture sensitive element 6 and the aperture 3 and the moisture must seep past the ends of the sheet member before it can seep back to the moisture sensitive element 6.

These arrangements are particularly suitable for use with fluid lines formed of narrow diameter pipes however are equally suitable for pipes of larger diameters.

Figure 4:
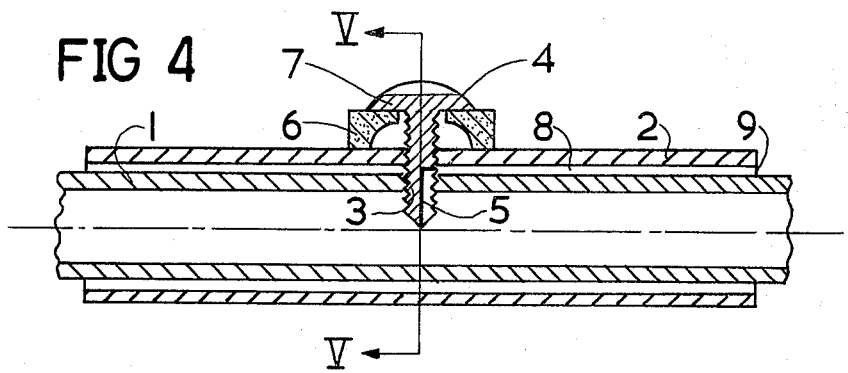
FIG. 4 is a longitudinal section through a further form of flow control device of the present invention.
Figure 5:
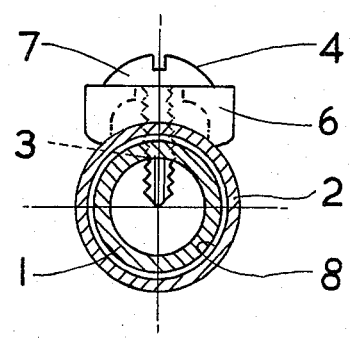
FIG. 5 is a cross-section along the line V - V of FIG. 4.

In a further embodiment of the invention shown in FIGS. 4 and 5 a screw-like member 4 which is preferably self-tapping is passed through fluid barrier member, shown in the form of a casing 2 and through the discharge outlet aperture 3 provided in the fluid line 1. If desired a rivet member could be used in its stead, preferably a push fit into the aperture 3.

The moisture sensitive element 6 is provided around the shank of the screw member 4 between the head 7 of the member 4 and the outer surface of the sleeve member or casing 2. A slot or groove 5 is provided in the tip or inner end portion of the screw member 4 so that fluid can pass freely from the fluid supply line 1 through the aperture 3 and into the annular space 8. This slot is of such a length as to stop short within the flexible sleeve member 2 to prevent any direct contact between the fluid and moisture sensitive element 6 at this point. As the moisture absorbing element 6 absorbs moisture and expands pressure will be applied to the flexible sleeve member 2 to gradually force the member 2 to close off the annular space 8 in the vicinity of the aperture 3 to a slow trickle and finally completely cut off the flow. As the moisture absorbing element dries out the pressure on the flexible casing 2 will be released and communication between the supply line 1 and annular space 8 will gradually re-open.

Control of the point of cut-off of flow can be made by rotation of the head of the nut to adjust the position of material 6.

This arrangement is preferably more suitable for larger diameter pipes where the curve of the pipe is not so acute and therefore a flatter seat for the moisture absorbing elements is provided.

It is also envisaged that the flexible sleeve member or casing 2 could be provided with apertures which will also increase the egress of fluid from the annular space 8 to the surrounding soil if desired.

The use of this type of flow control device is suitable for most underground watering applications and is particularly suited to a group system in which many such devices are located equally spaced to cover the irrigation requirements of an extensive area.

A low pressure water system may be used in which thin walled fluid supply lines and simple connections can be used and low pressure water supplied by gravity from elevated tanks. Water is led to the area to be irrigated by a system of discharge conduits branching from a main discharge conduit leading from each elevated tank and laid beneath the soil, to each branch of the discharge system being provided with the variable opening and closing flow control device controlling the discharge of liquid to the surrounding area.

Alternatively a high pressure main may be provided to feed liquid to an irrigation system of thin walled tubing laid beneath ground level and provided with a pressure reducing valve in each branch of the system to reduce the pressure flowing towards the irrigation system and to the flow control devices of the present invention. The valves and connection and conduits of the irrigation system should be constructed to suit the pressure and a range, for example, of 5 lbs per square inch to 30 lbs per square inch would be suitable.

If it is desired to grow plants in barren soil or to increase the growth of plants in good soil, nutriment could be supplied by its addition in solution with the irrigation water, the chemicals used varying in content for example according to the pH required to suit the type of plant involved.

It is further envisaged that pesticides may be added to the irrigation water and supplied in solution to the area surrounding the plants.

It is also envisaged that where small bore pipes are used they may have electrically conductive channels formed into their walls and semi-conductive heating elements can be attached to or built in at the points requiring heat for plant health or frost control. Connectors for the passage of electrical current would be provided at all branches and joints in the pipe work, the electrical power supply being especially modified and controlled so that the heating effect does not approach temperatures detrimental to the plants or to the pipe work.

It will be appreciated that the invention is not specifically limited to the particular arrangement described above but many and various forms of the invention are envisaged without departing from the scope of the invention as set forth in the appended claims.

I claim:

1. A variable opening and closing flow control device for an underground fluid supply line which includes means defining an outlet aperture in said line; an elongate member, one end portion of said elongate member being inserted through said outlet aperture into said supply line, the other end portion of said elongate member extending outwardly of said supply line; a moisture sensitive element positioned about said outer end portion of said elongate member; said moisture sensitive element being composed of a moisture absorbing material having the property of swelling as it absorbs moisture and contracting as it dries; a flexible fluid barrier member positioned between said aperture and said element; adjustable means engaging the outer end portion of said moisture sensitive element to hold said element in contact with the fluid barrier member; flange means provided on said elongate member intermediate the end portions thereof and positioned between the fluid supply line and fluid barrier member; means on said flange means defining a recess therewith; a bore provided in said elongate member communicating between the interior of the supply line and said recess; shoulder means provided on said elongate member intermediate the end portions thereof, a flexible washer means engageable about said elongate member between said shoulder means and the flexible fluid barrier member; adjustable nut means provided on said elongate member adjacent the outer surface of said flexible fluid barrier member, adjustable to tighten against said barrier member to form a seal therewith about said elongate member; and sealing means provided about said elongate member adjacent said outlet aperture in the supply line; whereby the gradual swelling and contraction of said moisture sensitive element is arranged to apply pressure onto the flexible fluid barrier member and said washer means and gradually close off and open respectively said recess to control said flow passage of fluid in dependence upon the moisture content of the underground medium surrounding the device.

2. A variable opening and closing flow control device as claimed in claim 1 in which said fluid barrier member comprises a casing surrounding said fluid supply line.

3. A variable opening and closing flow control member as claimed in claim 1 in which said fluid barrier member comprises a sheet member.

4. A variable opening and closing flow control device for an underground fluid supply line which includes means defining an outlet aperture in said line; a moisture sensitive element mounted in proximity to said aperture and composed of a moisture-absorbing material having the property of swelling as it absorbs moisture and contracting as it dries; a flexible fluid-barrier member positioned between said fluid supply line and said element and extending part-way along the length of said supply line; means inserted through said aperture and said barrier member into the fluid supply line and providing a flow passage through said aperture from said supply line and discharging between said barrier member and said supply line, said fluid discharge being forced to travel beyond the periphery or ends of the fluid barrier member before coming into contact with the moisture-sensitive absorbing material to cause the swelling thereof, whereby the swelling and contraction of said moisture sensitive element is arranged to apply pressure onto the flexible fluid-barrier member to control said flow passage of fluid from the supply line in dependence upon the moisture content of the moisture-absorbing material.

5. A variable opening and closing flow control device for an underground fluid supply line which includes means defining an outlet aperture in said line; a moisture-sensitive element mounted in proximity to said aperture and composed of a moisture absorbing material having the property of swelling as it absorbs moisture and contracting as it dries; a flexible fluid barrier member positioned between said fluid supply line and said element and extending part-way along the length of said supply line; means inserted through said aperture and said barrier member into the fluid supply line providing a flow passage through said aperture from said supply line and discharging through an opening disposed between said barrier member and said supply line, said fluid discharge being forced to travel beyond the fluid barrier member before coming into contact with the moisture-sensitive absorbing material to cause swelling thereof, flexible washer means movable to close off said opening, whereby the gradual swelling and contraction of said moisture-sensitive element is arranged to apply pressure onto the flexible fluid barrier member and said washer means and gradually close off and open respectively said opening to control said flow passage of fluid from the supply line in dependence upon the moisture content of the moisture-absorbing material.

6. A variable opening and closing flow control device for an underground fluid supply line which includes means defining an outlet aperture in said line; an elongate member, one end of said elongate member being inserted through said outlet aperture into said fluid supply line, the other end portion of said elongate member extending outwardly of said supply line; a moisture-sensitive element positioned about said outer end portion of said elongate member; said moisture-sensitive element being composed of a moisture-absorbing material having the property of swelling as it absorbs moisture and contracting as it dries; a flexible fluid-barrier member positioned between said aperture and said element and extending partway along the length of said supply line; adjustable means engaging with the outer end portion of the moisture-sensitive element to hold said element in contact with the fluid-barrier member; a bore provided in said elongate member leading from the interior of the supply line, the bore having a mouth discharging between said supply line and fluid-barrier member to enable fluid discharge between said supply line and fluid-barrier member, said fluid discharge being forced to travel beyond the periphery or ends of the fluid barrier member before coming into contact with the moisture-sensitive absorbing material to cause swelling thereof, a flexible washer means movable to close off said mouth of the bore whereby the swelling and contraction of said moisture-sensitive element is arranged to apply pressure onto the flexible fluid-barrier member and washer means to control said flow passage of fluid in dependence upon the moisture content of the moisture-absorbing material.

7. A variable opening and closing flow control device for an underground fluid supply line which includes means defining an outlet aperture in said line; an elongate member, one end portion of said elongate member being inserted through said outlet aperture into said supply line, the other end portion of said elongate member extending outwardly of said supply line; a moisture-sensitive element positioned between said outer end portion of said elongate member; said moisture-sensitive element being composed of a moisture absorbing-material having the property of swelling as it absorbs moisture and contracting as it dries; a flexible fluid-barrier member positioned between said aperture and said element and extending part-way along the length of said supply line; adjustable means engaging the outer end portion of said moisture-sensitive element to hold said element in contact with the fluid-barrier member; flange means provided on said elongate member intermediate the end portion thereof and positioned between the fluid supply line and fluid-barrier member; means on said flange means defining a recess therewith; a bore provided in said elongate member communicating between the interior of the supply line and said recess; shoulder means provided on said elongate member intermediate the end portion thereof, a flexible washer means engageable about said elongate member between said shoulder means and flexible fluid-barrier member; adjustable nut means provided on said elongate member adjacent the outer surface of the flexible fluid-barrier member, adjustable to tighten against said barrier member to form a seal therewith about said elongate member; and sealing means provided about said elongate member adjacent said outlet aperture in the supply line; whereby the gradual swelling and contraction of said moisture sensitive element is arranged to apply pressure onto the flexible fluid-barrier member and said washer means and gradually close off and open respectively said recess to control said flow passage of fluid in dependence upon the moisture content of the medium surrounding the device.

8. A variable opening and closing flow control device for an underground fluid supply line which includes means defining an outlet aperture in said line, a member having a head portion and a shank portion, said shank portion being inserted into said outlet; a moisture sensitive element positioned about said shank portion and between said head portion and said fluid supply line and composed of a moisture-absorbing material having the property of swelling as it absorbs moisture and contracting as it dries; a flexible fluid-barrier member positioned between said fluid supply line and said element and extending part-way along the length of said supply line; means defining a fluid passageway in said shank portion extending from within the supply line for flow of fluid from the supply line and discharging between the supply line and barrier member, said fluid discharge being forced to travel beyond the fluid-barrier member before coming into contact with the moisture-sensitive absorbing material to cause the swelling thereof, whereby the swelling and contraction of said moisture-sensitive element is arranged to apply pressure onto the flexible fluid-barrier member to control the flow of fluid from the supply line in dependence upon the moisture content of the medium surrounding the device.

9. An irrigation system which comprises a fluid supply line having at least one variable opening and closing flow control device interposed therein and located beneath the surface of the soil in or adjacent to the area to be irrigated, which supply line is arranged to supply and discharge liquid beneath the surface of the soil to be irrigated and said opening and closing flow control device includes means defining an outlet aperture in said line; an elongate member, one end portion of said elongate member being inserted through said outlet aperture into said supply line, the other end portion of said elongate member extending outwardly of said supply line; a moisture-sensitive element positioned about said outer end portion of said elongate member; said moisture-sensitive element being composed of a moisture-absorbing material having the property of swelling as it absorbs moisture and contracting as it dries; a flexible fluid barrier member positioned between said aperture and said element, adjustable means engaging the outer end portion of said moisture-sensitive element to hold said element in contact with the fluid-barrier member; flange means provided on said elongate member intermediate the end portions thereof and positioned between the fluid supply line and fluid barrier member; means on said flange means defining a recess therewith; a bore provided in said elongate member communicating between the interior of the supply line and said recess; shoulder means provided on said elongate member intermediate the end portion thereof, a flexible washer means engageable with said elongate member between said shoulder means and the flexible fluid-barrier member; adjustable nut means provided on said elongate member adjacent the outer surface of said flexible fluid-barrier member, adjustable to tighten against said barrier member to form a seal therewith about said elongate member; and sealing means provided about said elongate member adjacent said outlet aperture in the supply line; whereby the gradual swelling and contracting of said moisture-sensitive element is arranged to apply pressure onto the flexible fluid-barrier member and said washer means and gradually close off and open respectively said recess to control said flow passage of fluid in dependence upon the moisture-content of the underground medium surrounding the device.

10. An irrigation system which comprises a fluid supply line having at least one variable opening and closing flow control device interposed therein and located beneath the surface of the soil in or adjacent the area to be irrigated, which supply line is arranged to supply and discharge liquid into the surface of the soil to be irrigated and said opening and closing flow control device includes means defining an outlet aperture in said line; a moisture-sensitive element mounted in proximity to said aperture and composed of a moisture-absorbing material having the property of swelling as it absorbs moisture and contracting as it dries; a flexible fluid barrier member positioned between said fluid supply line and said element and extending part-way along the length of said supply line; means inserted through said aperture and said barrier member into the fluid supply line and providing a flow passage through said aperture from said supply line and discharging between said barrier member and said supply line, said fluid discharge being forced to travel beyond the periphery of ends of the fluid barrier member before coming into contact with the moisture sensitive absorbing material to cause the swelling thereof, whereby the swelling and contraction of said moisture-sensitive element is arranged to apply pressure onto the flexible fluid-barrier member to control said flow passage of fluid from the supply line in dependence upon the moisture content of the moisture-absorbing material.

11. An irrigation system which comprises a fluid supply line having at least one variable opening and closing flow control device interposed therein and located beneath the surface of the soil in or adjacent to the area to be irrigated, which supply line is arranged to supply and discharge liquid beneath the surface of the soil to be irrigated and said opening and closing flow control device includes means defining an outlet aperture in said line; a moisture-sensitive element mounted in proximity to said aperture and composed of a moisture absorbing material having the property of swelling as it absorbs moisture and contracting as it drieds; a flexible fluid-barrier member positioned between said fluid supply line and said element and extending part-way along the length of said supply line; means inserted through said aperture and said barrier member into the fluid supply line providing a flow passage through said aperture from said supply line and discharging through an opening disposed between said barrier member and said supply line, said fluid discharge being forced to travel beyond the periphery or ends of the fluid barrier member before coming into contact with the moisture-sensitive absorbing material to cause swelling thereof, flexible washer means movable to close off said opening, whereby the gradual swelling and contraction of said moisture-sensitive element is arranged to apply pressure onto the flexible fluid-barrier member and said washer means and gradually close off and open respectively said opening to control said flow passage of fluid from the supply line in dependence upon the moisture content of the moisture-absorbing material.

12. An irrigation system which comprises a fluid supply line having at least one variable opening and closing flow control device interposed therein and located beneath the surface of the soil in or adjacent to the area to be irrigated, which line is arranged to supply and discharge liquid into the soil to be irrigated and said opening and closing flow control device includes means defining an outlet aperture in said line; a member having a head portion and a shank portion, the shank portion being inserted into said outlet; a moisture sensitive element positioned about said shank portion and between said head portion and said fluid supply line and composed of a moisture absorbing material having the property of swelling as it absorbs moisture and contracting as it dries; a flexible fluid-barrier member positioned between said fluid supply line and said element and extending part-way along the length of said supply line; means defining a fluid passageway in said shank portion extending from within the supply line for flow of fluid from the supply line discharging between the supply line and the barrier, said fluid discharge being forced to travel beyond the periphery or ends of the fluid barrier member before coming contact with the moisture sensitive absorbing material to cause swelling thereof, whereby the swelling and contraction of said moisture sensitive element is arranged to apply pressure onto the flexible fluid-barrier member to control the flow of fluid from the supply line in dependence upon the moisture content of the medium surrounding the device.

* * * * *